United States Patent Office 3,428,834
Patented Feb. 18, 1969

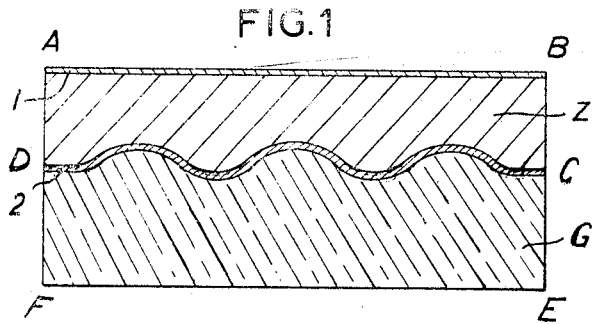
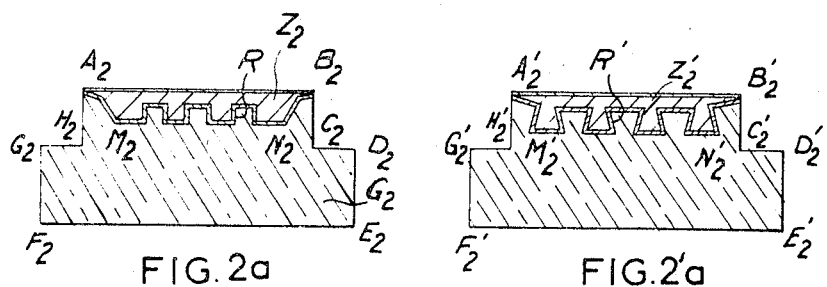
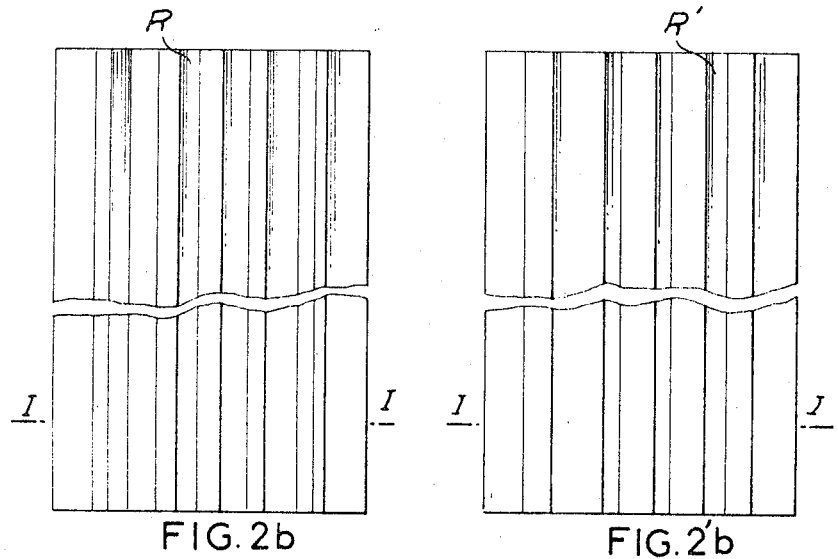

3,428,834
COMPOSITE ELECTRODE FOR MAGNETO-
HYDRODYNAMIC GENERATOR
David Yerouchalmi, Issy-les-Moulineaux, France, assignor to Commissariat a l'Energie Atomique, Paris, France
Filed July 1, 1965, Ser. No. 468,761
Claims priority, application France, July 2, 1964, 980,392
U.S. Cl. 310—11                                     5 Claims
Int. Cl. G21d 7/02; H02k 45/00

ABSTRACT OF THE DISCLOSURE

A composite electrode for an MHD device. A gas contacting thermoionic plate of refractory oxide is bonded to a monolithic graphite base member by an intermediate layer comprised of a boride or a carbide of the refractory oxide. The top of said base member is formed with slots or holes arranged to receive elongate bars or cylinders depending from the bottom of the thermoionic plate. The gas contacting surface of the plate is covered with a thin layer of a boride.

The present invention relates to composite electrodes and relates particularly to a composite electrode intended to be used under very high temperature conditions, the electrode preferably being used each time it operates to establish an electrical connection between a fluid at high temperature and a conductor at low temperature, as is the case in a magnetohydrodynamic converter.

In a magnetohydrodynamic converter, the flat face of the electrode subjected to the action of hot gases should withstand very high temperatures, generally of the order of 2000° to 3000° K., in an oxidising atmosphere containing alkaline vapours, while causing at the gas/electrode interface a negligible fall in potential with respect to the ionised gas.

Materials which can be used for making such electrodes are constituted for example by certain refractory oxides, such as zirconia and thoria, stabilised with a certain percentage of calcium oxide, yttrium oxide or rare earth oxides, which also serve to render the zirconium and thorium oxides more conductive at high temperature.

However, only the sufficiently heated part of the oxides is conductive, in the case, for example, of MHD generators where the electrode generally has the form of a small block heated at one face, which is in contact with the ionised gas. Above a certain thickness, the stabilised refractory oxide is no longer sufficiently hot to be conductive.

The composite electrode according to the invention overcomes this disadvantage. This electrode comprises a first zone made of a refractory oxide and a second zone of graphite, to which the oxide is connected through the intermediary of an interfitting layer.

The refractory oxide is constituted for example by stabilised zirconium or thorium oxide which, if required, is doped to have a better thermoionic emissivity by the addition, for example, of zirconium diboride.

The invention will now be described with reference to the accompanying drawings, in which:

FIG. 1 shows a diagram of the principle of a composite electrode according to the invention;

FIGS. 2, 3 and 4 show illustrative embodiments of particular forms of the composite electrode of the invention;

An electrode according to the invention is first described in relation to FIG. 1. The electrode is constituted by a block ABEF of parallelepiped form, AB being the face subjected to hot gases. At an average depth AD from the hot face, the value of which depth depends upon the temperature gradient, the electrode is divided along a line CD into two parts, one of which, ABCD, is formed of a refractory oxide Z which can be stabilised and doped and is a conductor at high temperature, while the second part CDFE is of graphite G. At the separation line CD, an interfitting layer 2 is applied, which serves to ensure electrical contact between the two zones while forming a ceramic bond between them. This interfitting layer is constituted by a carbide or boride of the refractory oxide or of a standard refractory metal such as molybdenum, niobium, tantalum or tungsten or of a noble refractory metal such as platinum, rhodium, iridium or their alloys.

The face in contact with the hot ionised gases is covered with a boride 1 having good thermoionic emission.

Application of the layers 1 and 2 is effected by brushing, gunning or by dipping and with or without subsequent heat-curing. The layer 2 can also be made of a layer of an ordinary or noble refractory metal interposed between Z and G or by any other means giving electrical contact (for example, conductive powders, lattices or metallic mixes).

FIGS. 2a and 2b, as well as FIGS. 2a' and 2b', show, respectively, in transverse section along I—I and in plan view, a composite electrode according to the invention. In this electrode, the refractory oxide $Z_2$ or $Z_2'$ is cast as a paste on to a block $G_2$ or $G_2'$ of grooved graphite, the grooves being shown at R or R'. The bases $A_2M_2N_2B_2$ or $A_2'M_2'N_2'B_2'$ of the grooves R and R' are covered with an interfitting layer and the face $A_2B_2$ or $A_2'B_2'$, which will be in contact with the hot gases, is covered with a thermoionically emissive boride.

Figure 3A:
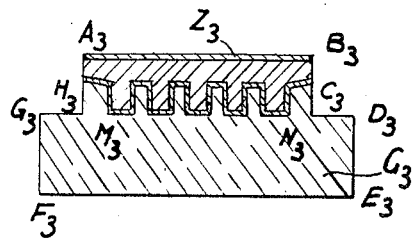
Figure 3B:
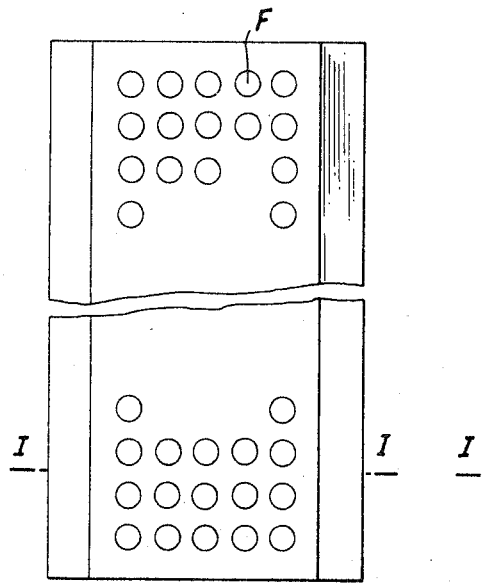

FIGS. 3a and 3b show, in transverse section on I—I and in plan view, a composite electrode in which the aforementioned grooves R and R' have been replaced by drilled holes.

Figure 4A:
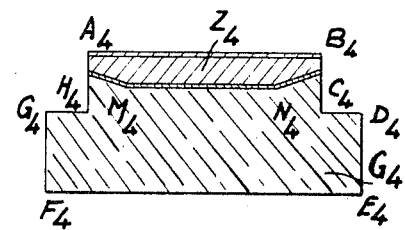
Figure 4B:
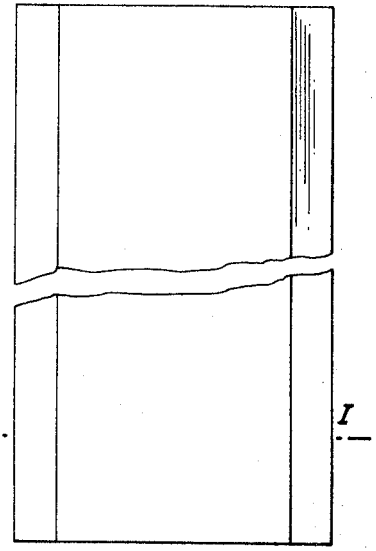

FIGS. 4a and 4b show, in transverse section along I—I and in plan view, another composite electrode according to the invention.

Figure 6A:
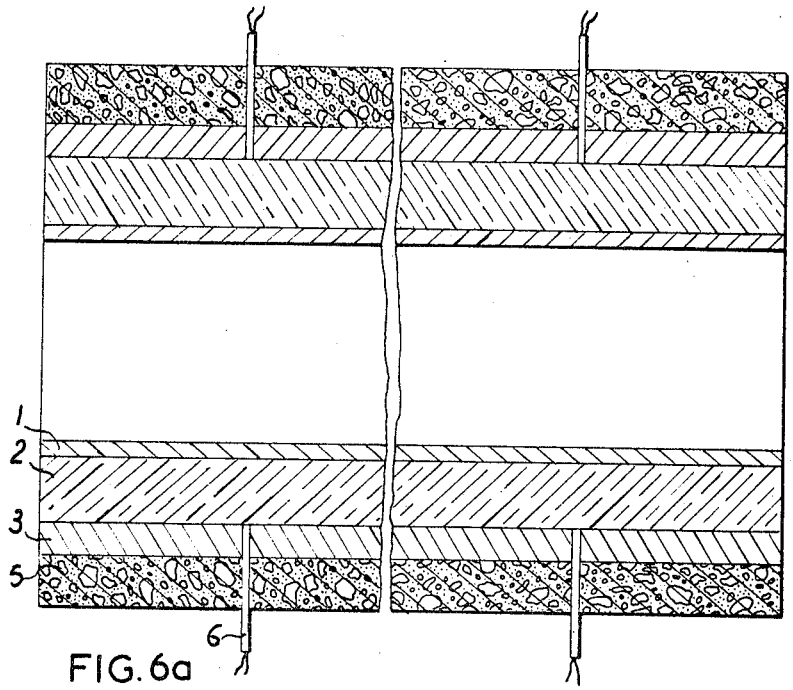
Figure 6B:
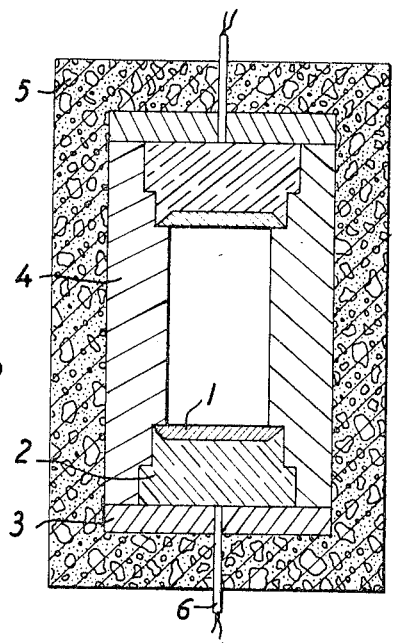

The oxide $Z_4$ is a ceramic plate or block shaped to have a trapezoidal profile, as indicated at $A_4B_4N_4QPM_4$ by way of example and applied to a graphite block $G_4$ by the constructional means shown in FIG. 6b. The surface $M_4PQN_4$ is covered with an adhesive bond or interfitting layer and the heated face $A_4B_4$ with a thermoionically emissive boride.

Figure 5A:
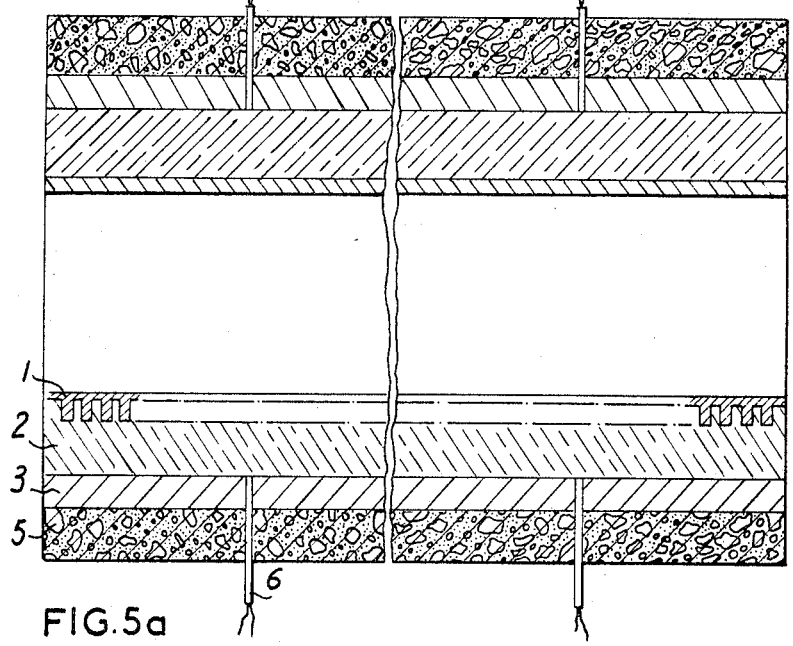
FIGS. 5 and 6 show by way of illustrative example and respectively in transverse and longitudinal section, an assembly of electrodes of the type shown in FIGS. 2 or 3 on the one hand and of the type shown in FIG. 4 on the other hand in an MHD conversion channel.
Figure 5B:
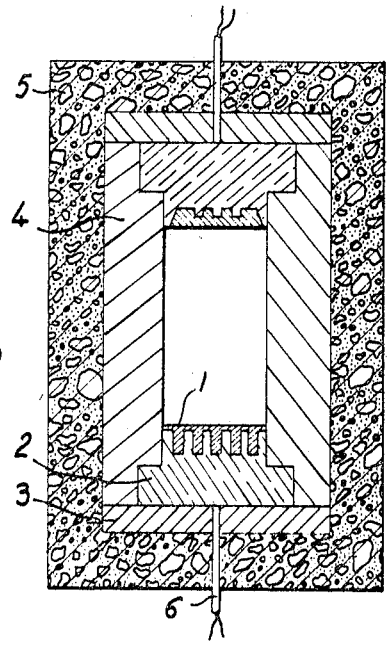

FIGS. 5a and 5b show in longitudinal and transverse section an MHD conversion channel using electrodes according to FIGS. 2, 2' and 3.

FIGS. 6a and 6b show in longitudinal and transverse section an MHD conversion channel using electrodes trodes according to FIG. 4. In these figures, the refractory oxide is shown at 1, the graphite at 2, the insulating refractory ceramics at 3 and 4, the refractory concrete at 5 and the current leads at 6.

Formation of the oxide Z can be carried out by any appropriate means, e.g., application in slip form, dry pressing and sintering or isostatic pressing and sintering. The refractory oxide can contain additives to improve the thermoionic emissivity, the electrical conductivity and the compatibility of the materials Z and G.

I claim:
1. A composite electrode for a MHD device including, a thermionic plate of refractory oxide material selected from the group consisting of zirconia and thoria, said plate having a top side arranged to contact the hot gases in said MHD device and a bottom side having fastening means depending therefrom;

a monolithic graphite base member having a bottom side adapted to be connected to an electrical conductor and a top side with recesses formed therein to receive said fastening means; and an intermediate conducting layer bonding said plate to said base member, said intermediate layer being selected from the group consisting of borides and carbides of the refactory oxide, standard refractory metals and noble refractory metals.

2. A composite electrode as described in claim 1 wherein
the top side of said plate is covered with a layer of a boride and said intermediate layer consists of a boride of the refactory oxide.

3. A composite electrode as described in claim 1 wherein
the top side of said plate is covered with a layer of a boride and said intermediate layer consists of a carbide of the refactory oxide.

4. A composite electrode as described in claim 1 wherein said fastening means are vertically arranged cylinders and said recesses are vertical round holes of suitable diameter and length to receive said cylinders.

5. A composite electrode as described in claim 1 wherein
said fastening means are elongate bars and said recesses are narrow slots extending the length of said base member.

References Cited

UNITED STATES PATENTS

| | | | |
|---|---|---|---|
| 2,459,841 | 1/1949 | Rouse | 313—346 |
| 2,460,739 | 2/1949 | Francis | 313—346 |
| 2,808,530 | 10/1957 | Katz | 313—346 |
| 2,950,993 | 8/1960 | Umbreit | 313—346 X |
| 3,171,060 | 2/1965 | Wood et al. | 315—111 |
| 3,274,408 | 9/1966 | Louis | 310—11 |
| 3,339,267 | 9/1967 | Bronnes et al. | |

DAVID X. SLINEY, *Primary Examiner.*

U.S. Cl. X.R.

313—311, 346